July 29, 1924.
G. W. CARLSON
1,502,659
LUBRICATION OF AUTOMOTIVE VEHICLE KNUCKLES
Filed Dec. 11, 1923
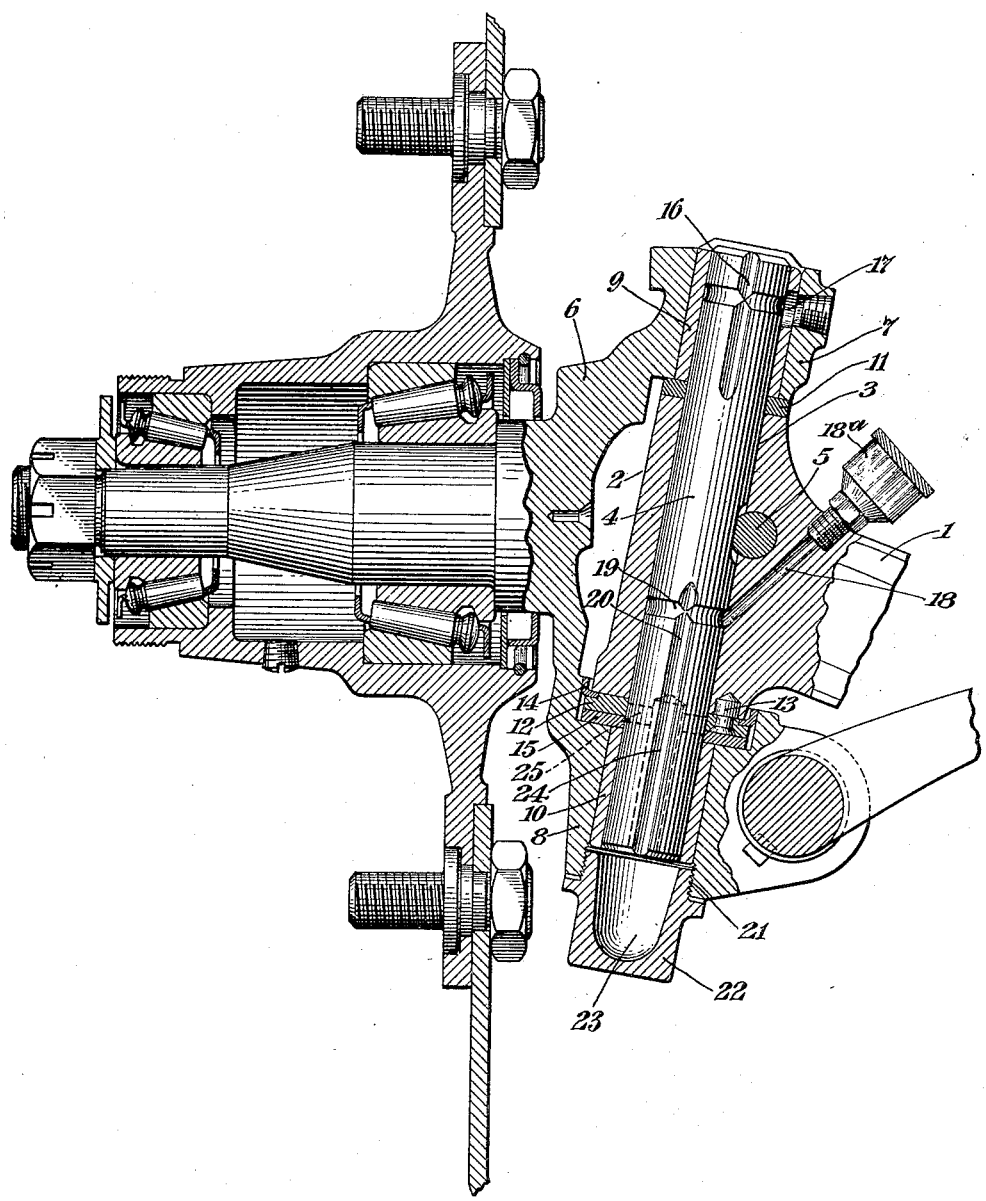
INVENTOR
Gustav W. Carlson
BY Ward Crosby & Smith
his ATTORNEYS Patented July 29, 1924.

1,502,659

UNITED STATES PATENT OFFICE.

GUSTAV W. CARLSON, OF CLEVELAND, OHIO, ASSIGNOR TO THE EATON AXLE & SPRING COMPANY, OF CLEVELAND, OHIO, A CORPORATION OF OHIO.

LUBRICATION OF AUTOMOTIVE VEHICLE KNUCKLES.

Application filed December 11, 1923. Serial No. 679,907.

*To all whom it may concern:*

Be it known that I, GUSTAV W. CARLSON, a subject of King Gustav V of Sweden (first U. S. citizenship papers taken out in September, 1918), and resident of Cleveland, in the county of Cuyahoga and State of Ohio, have invented certain new and useful Improvements in the Lubrication of Automotive Vehicle Knuckles, of which the following is a specification.

My invention relates to lubrication of automotive vehicle knuckles, such for example as the lubrication of steering knuckles of automobiles.

Maintaining proper lubrication of steering knuckles of automotive vehicles has been found difficult, and the object of this invention is to insure more reliable and efficient lubrication of the bearings of such apparatus.

According to the preferred embodiment of my invention, I provide an oil reservoir in that portion of the steering knuckle at the lower end of the knuckle pivot, and provide a passage from the reservoir to the thrust washer about the pivot, such that the washer may be lubricated from the reservoir by splash when the oil level is below the washer.

My invention consists in the novel construction, arrangement and combination of parts hereinafter described according to the preferred embodiment thereof. The invention will be more particularly pointed out in the appended claims.

The drawing shows, by way of illustration, a sectional view of portions of the front axle and wheel, and the steering knuckle, pivot, and associated parts.

The front axle of an automobile is designated as 1. The end 2 of the axle is provided with a bore or bearing 3 through which extends a steering knuckle pivot 4. A key 5 holds the pivot against rotation. The steering knuckle 6 has two forked ends 7 and 8 each of which is provided respectively with bushings 9 and 10 which are carried on the extended ends of the pivot 4, providing thereby for the oscillation of the knuckle about the pivot. A washer 11 is interposed between the upper portion of the axle end 2 and the knuckle fork 7. A fixed washer plate 12 is attached to the lower portion of the axle end by means of a stud 13 and a leather oil ring 14 is held in place thereby.

A thrust washer 15 is interposed between the washer plate 12 and knuckle fork 8. Grooves 16 and a co-operating passage 17 provide means for lubricating the upper bearing 9. A hole 18 is drilled from a point external the front axle 1 to a point within the pivot bore 3, the pivot at this point being provided with a peripheral groove 19 and longitudinal grooves or passages 20 which extend to the end of the pivot for the purposes to be hereinafter described. In the present embodiment the reservoir is provided in the following manner: The lower end of the steering knuckle is threaded as at 21 into which is fitted a cup-shaped member 22 which is provided with an oil space or reservoir 23 adjacent the lower end of the pivot and in communication therewith. In the present embodiment the oil is supplied from the reservoir to the thrust washer as follows: A counter bore 24 extends through the pin from the lower end up to transverse communicating passages 25 leading to the thrust bearing 15. These passages are preferably of such size that if the oil level is below the bearing 15 the bearing will be lubricated by splash from the oil in the reservoir or in the passage 24.

*Lubrication.*

The oil or other lubricant is fed in through the axle at 18 and passes in through the grooves 19 and 20 down to the reservoir 23 at the same time lubricating the bearings 10 by passing out from groove 20. As long as the passages 18 and 20 are filled with oil the oil from the reservoir will seek its level by passing up through the counter bore 24, and from there will flow through the holes 25 to the thrust bearing 15. It might be desirable to have a large supply of oil feeding to the reservoir, in which case an oil cup 18ª would be attached to the axle hole 18. In either case, however, when the oil supply does get below the level of the thrust bearing 15, the oil from the reservoir 23 splashes up through passages 24 and 25 to the thrust bearing. The bearing 9 at the top of the pivot is lubricated by means of lubricant fed through hole 17 and grooves 16. It is, of course, most important to keep the thrust bearing 15 properly lubricated as this member carries the load from wheel to axle.

Having thus described my invention in detail in its present preferred embodiment, it will be obvious to those skilled in the art, after understanding my invention, that various changes and modifications may be made therein without departing from the spirit or scope thereof, and I aim in the appended claims to cover all such modifications and changes.

Having thus described my invention, what I claim as new and desire to secure by Letters Patent, is:

1. In a device of the character described, an axle provided with a steering knuckle pivot, a steering knuckle mounted on said pivot, a thrust washer between said axle and said knuckle, said knuckle being provided with an oil reservoir at the lower end of the pivot, means for supplying oil to the reservoir from a point above the level of said thrust washer, and means of communication between said reservoir and said thrust washer such that said thrust washer may be lubricated from said reservoir by splash when the oil level is below said thrust washer.

2. In a device of the character described, an axle provided with a steering knuckle pivot, a steering knuckle mounted on said pivot, a thrust washer between said axle and said knuckle, a member secured to the bottom of said knuckle and provided with an oil reservoir, means for supplying oil to the reservoir from a point above the level of said thrust washer, and means of communication between said reservoir and said thrust washer such that said thrust washer may be lubricated from said reservoir by splash when the oil level is below said thrust washer.

3. In a device of the character described, an axle provided with a steering knuckle pivot, a forked steering knuckle mounted on said pivot, a thrust washer between said axle and the lower fork of said knuckle, said knuckle being provided with an oil reservoir at the lower end of the pivot, means for supplying oil to the reservoir from a point above the level of said thrust washer, and means of communication in said pivot between said reservoir and said thrust washer such that said thrust washer may be lubricated from said reservoir by splash when the oil level is below said thrust washer.

4. In a device of the character described, an axle provided with a steering knuckle pivot, a forked steering knuckle mounted on said pivot, a thrust washer between said axle and the lower fork of said knuckle, said knuckle being provided with an oil reservoir at the lower end of the pivot, means for supplying oil to the reservoir from a point above the level of said thrust washer, said pivot being provided with a central bore extending from its lower end upwardly and a transverse bore extending therefrom to a point adjacent said thrust washer.

5. In a device of the character described, an axle provided with a steering knuckle pivot, a steering knuckle mounted on said pivot, said steering knuckle being provided with an oil reservoir adjacent said pivot, said axle being provided with an oil hole, said pivot being provided with a passage connecting said oil hole and said reservoir, and a thrust washer between said axle and said knuckle, said pivot being provided with an oil passage placing said thrust washer in communication with said oil reservoir.

6. In a device of the character described, an axle provided with a bearing for a steering knuckle pivot, a steering knuckle pivot secured therein, a steering knuckle mounted on said pivot free to oscillate thereabout, bearings interposed between said pivot and said knuckle, said steering knuckle being provided with an oil reservoir adjacent said pivot, said axle being provided with an oil hole, means of communication connecting said oil hole and said reservoir, a thrust washer between said axle and said knuckle, said pivot being provided with a central bore extending from its lower end upwardly to a point adjacent said thrust washer and a transverse bore through said pivot adjacent said washer and in communication with said central bore whereby the oil from said reservoir may be fed to said washer by splash.

7. In a device of the character described, an axle provided with a steering knuckle pivot, a steering knuckle mounted on said pivot, said pivot providing a means about which said steering knuckle may be swiveled, said steering knuckle being provided with an oil reservoir adjacent said pivot, an oil passage in said axle, means of communication between said passage and said reservoir for conducting oil to said reservoir, a thrust washer between said axle and said knuckle, said pivot being provided with an oil passage placing said thrust washer in communication with said oil reservoir.

In testimony whereof I have signed my name to this specification.

GUSTAV W. CARLSON.